United States Patent
Rosenthal (10) Patent No.: US 8,527,344 B2
(45) Date of Patent: Sep. 3, 2013

(54) CROWDSOURCED ADVERTISEMENTS SPONSORED BY ADVERTISERS IN A SOCIAL NETWORKING ENVIRONMENT

(75) Inventor: Brian Rosenthal, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 309 days.

(21) Appl. No.: 12/946,211

(22) Filed: Nov. 15, 2010

(65) Prior Publication Data
US 2012/0123858 A1     May 17, 2012

(51) Int. Cl.
*G06Q 30/00*      (2012.01)
(52) U.S. Cl.
USPC ..................... 705/14.49; 705/14.72
(58) Field of Classification Search
USPC ............................. 705/14.49, 14.72
See application file for complete search history.

(56) References Cited

U.S. PATENT DOCUMENTS

| | | | | |
|---|---|---|---|---|
| 7,730,216 | B1 * | 6/2010 | Issa et al. ................ | 709/250 |
| 7,853,622 | B1 * | 12/2010 | Baluja et al. ............. | 707/803 |
| 8,024,317 | B2 * | 9/2011 | Nair et al. ................ | 707/709 |
| 8,140,402 | B1 * | 3/2012 | Mesaros ................... | 705/26.1 |
| 8,234,193 | B2 * | 7/2012 | Ransom et al. ........... | 705/35 |
| 2007/0027760 | A1 * | 2/2007 | Collins et al. ............ | 705/14 |
| 2007/0073585 | A1 * | 3/2007 | Apple et al. .............. | 705/14 |
| 2007/0203903 | A1 * | 8/2007 | Attaran Rezaei et al. .. | 707/5 |
| 2007/0260520 | A1 * | 11/2007 | Jha et al. ................. | 705/14 |
| 2009/0182646 | A1 * | 7/2009 | Klinger et al. ............ | 705/26 |
| 2010/0082427 | A1 * | 4/2010 | Burgener et al. ......... | 705/14.49 |
| 2010/0125563 | A1 * | 5/2010 | Nair et al. ................ | 707/709 |
| 2010/0217645 | A1 * | 8/2010 | Jin et al. ................. | 705/9 |
| 2010/0217664 | A1 * | 8/2010 | Steelberg et al. ........ | 705/14.43 |
| 2010/0332330 | A1 * | 12/2010 | Goel et al. ............... | 705/14.66 |
| 2011/0047012 | A1 * | 2/2011 | Sherman .................. | 705/14.1 |
| 2011/0213655 | A1 * | 9/2011 | Henkin et al. ............ | 705/14.49 |
| 2011/0276397 | A1 * | 11/2011 | Moxley et al. ............ | 705/14.52 |
| 2012/0010929 | A1 * | 1/2012 | Kolli et al. ............... | 705/14.16 |
| 2012/0095828 | A1 * | 4/2012 | Evankovich et al. ...... | 705/14.49 |
| 2012/0123858 | A1 * | 5/2012 | Rosenthal ................ | 705/14.49 |

OTHER PUBLICATIONS

Burns, Janice; search Jun. 28, 2013; 12946211-426919-EIC3600 Search Results: Scientific and Technical Information Center.*

* cited by examiner

*Primary Examiner* — John G Weiss
*Assistant Examiner* — Adam Chornesky
(74) *Attorney, Agent, or Firm* — Fenwick & West LLP (57) ABSTRACT

Users of a social networking system are provided with advertisements when accessing content associated with the social networking system. The content of such advertisement may be generated by other users of the social networking system. An advertiser may provide an advertising template containing an advertised message and fields wherein a user can input an endorsement. The social networking system generates a user interface responsive to the template and provides the user interface to an endorsing user to receive the user's endorsement for the advertised product or event. The social networking system generates an advertisement responsive to the advertisement content provided by the advertiser and the endorsement content provided by the endorsing user. The social networking user can provide the generated advertisements to viewing users who meet the advertisement's targeting criteria and display criteria provided by the endorsing user.

20 Claims, 5 Drawing Sheets

CROWDSOURCED ADVERTISEMENTS SPONSORED BY ADVERTISERS IN A SOCIAL NETWORKING ENVIRONMENT

BACKGROUND

This invention relates generally to social networking, and in particular to crowdsourced advertising within a social networking system.

Electronic advertisements, such as those displayed on a web page, have become commonplace. A typical user of the World Wide Web or a social networking system can face tens or hundreds of online advertisements a day. Since a user is faced with such a large number of advertisements, a user generally does not have any personal connection with an advertisement. Additionally, users typically avoid looking at advertisements on web pages altogether. These factors tend to reduce the effectiveness of advertising a product over the Internet.

Some advertisers target ads to particular users. For example, ads can be targeted to a user based on user provided preferences or user generated data such as search terms. Advertisers can offer products related to the user provided search terms. Such targeted advertisements may anticipate a user's need better than advertisements with randomly selected content. However, targeted advertisements often fail to earn a user's trust in the advertised product. For example, the user may be skeptical of the claims made by the advertisement. Thus, targeted advertisements may not be very effective in selling an advertised product.

In one instance, advertisers can outline the benefits of a product in an online advertisement, a user may not view the advertisement long enough to understand or recognize its competitive advantages. To preserve some product differentiation, advertisers can pay endorsers such as famous athletes or movie stars to promote their products. However, users are often weary of such for-benefit promotions and discount paid endorsements. Thus, advertisers are often unable to effectively sell products associated with an advertisement.

SUMMARY

Embodiments of the invention provide advertisements that improve the credibility and trust of the advertised products by using user generated content and leveraging the information stored within the social networking system. Providing advertisements generated by users of the social networking system allows advertisers to generate trust in the advertised product. Users generally have more confidence in purchasing a products endorsed by a friend. Most users trust endorsements generated by friends because friends likely have similar needs and use for a product as the user. Additionally, if friends are not compensated for endorsing a product, users likely do not discount the value of the endorsement. Unlike advertisements, most users seek and read content generated by their friends within the social networking system; thus, advertisements generated by a friend of the user are more likely to catch the attention of the user, increasing the effectiveness of the advertisement.

In one embodiment, the social networking system generates a user-endorsed advertisement by combining advertising content provided by an advertiser with endorsement content provided by a user of the social networking system. In one embodiment, the social networking system receives an advertisement template from an advertiser. The advertisement template comprises advertising content and one or more fields for a user endorsement. For example, the social networking system can receive a template identifying a product to be endorsed and a field requesting a reason for the user endorsement of the product. The social networking system generates a user interface in connection with the received advertisement template. For example, the user interface can include the advertisement content provided by the advertiser and a text box to receive the user endorsement.

In one embodiment, the social networking system receives the user endorsement and generates a user-endorsed advertisement by combining the user generated endorsement content and the advertisement message provided by the advertiser. The generated advertisement may then be provided to users of the social networking system. The social networking system may provide a user-endorsed advertisement to a viewing user based on a likelihood that the viewing user will click on the advertisement and the revenue associated with displaying the advertisement. The social networking system may also apply targeting criteria provided by the advertiser and/or any applicable privacy policies in the social networking system to select the user-endorsed advertisement to display to the viewing user. The user-endorsed advertisement may also be selected for a particular viewing user based at least in part on the relationship between the viewing user and the endorsing user in the social networking system.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Overview

A social networking system offers its users the ability to communicate and interact with other users of the system. In use, users join the social networking system and then add connections to a number of other users to whom they desire to be connected. As used herein, the term "friend" refers to any other user to whom a user has formed a connection, association, or relationship via the social networking system. Connections may be added explicitly by a user, for example, the user selecting a particular other user to be a friend, or automatically created by the social networking site based on common characteristics of the users (e.g., users who are alumni of the same educational institution). Connections in social networking systems are usually in both directions, but need not be, so the terms "user" and "friend" depend on the frame of reference. The connection between users may be a direct connection; however, some embodiments of a social networking system allow the connection to be indirect via one or more levels of connections. Also, the term friend need not require that users actually be friends in real life, (which would generally be the case when one of the users is a business or other entity); it simply implies a connection in the social networking system.

In addition to interactions with other users, the social networking system provides users with the ability to take actions on various types of items supported by the system. These items may include groups or networks (where "networks" here refer not to physical communication networks, but rather social networks of people) to which users of the social networking system may belong, events or calendar entries in which a user might be interested, computer-based applications that a user may use via the system, and transactions that allow users to buy or sell items via the system. These are just a few examples of the items upon which a user may act on a social networking system, and many others are possible.

Figure 1:
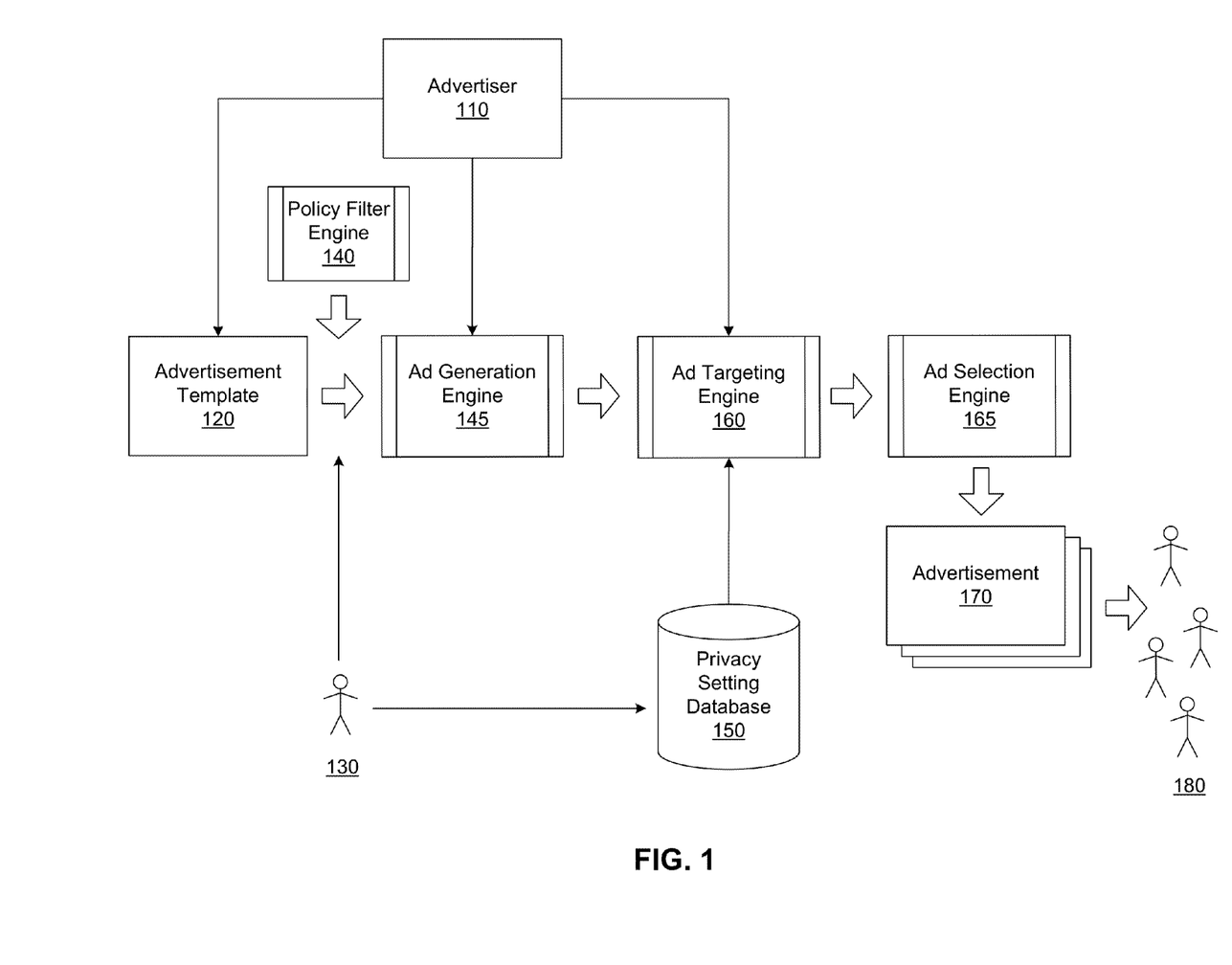
FIG. 1 is a diagram of a system for providing a user endorsed advertisement to users of a social networking system, in accordance with an embodiment of the invention.

FIG. 1 illustrates a system for providing a user generated advertisement to users of a social networking system, in accordance with an embodiment of the invention. FIG. 1 illustrates an advertiser 110, an advertisement template 120, a user 130 of a social networking system, a policy filter engine 140, an ad generation engine 145, a privacy setting database 150, an ad targeting engine 160, an ad selection engine 165, one or more advertisements 170 and additional users of the social networking system 180.

In one embodiment of the invention, the advertiser 110 provides the social networking system with an advertisement template 120. The advertisement template 120 includes an advertisement message provided by the advertiser 110 and one or more fields for a user endorsement. For example, the advertisement message can identify a product to be endorsed, an image associated with the product, or a time and place of an advertised event.

The social networking system provides a user interface based on the received template and presents the user interface to an endorsing user of the social networking system. In one embodiment, the user interface comprises a text box to allow a user to enter an endorsement for a product. Once a user enters an endorsement, the social networking system receives the user generated endorsement.

In one embodiment, the policy filter 140 analyzes the user endorsement to determine if the endorsement message is a favorable endorsement or if it is consistent with the advertiser's ad criteria. For example, an advertiser 110 may provide that endorsements with profanity should not be published. In such an instance, the policy filter 140 analyzes and filters endorsements containing profanity. In another example, the policy filter removes any user-provided content that is not positive (e.g., a bad review).

The ad generation engine 145 generates a user endorsed ad by combining the advertisement message provided by the advertiser 110 and the user provided endorsement. The generated ad can be a banner ad to be displayed on a webpage, a part of a newsfeed story to be delivered to a viewing user, or any other communication directed to a viewing user.

In one embodiment, the ad selection engine 165 identifies which user-endorsed ads to display to a viewing user. For example, the ad selection engine 165 displays a user-endorsed ad to a viewing user only if the user meets the endorsed advertisement's targeting criteria provided by the advertiser 110, based on the relationship between the endorsing user and the viewing user within the social networking system, and the social networking system privacy settings 150 associated with the endorsing user. In another embodiment, the ad targeting engine 160 identifies one or more users responsive to a user endorsed ad generated by the ad generation engine 145.

In one embodiment, the social networking system displays the generated user endorsed ads to the viewing users 180 if the generated ad and the viewing users meet advertiser provided content criteria, ad targeting criteria and the endorsing user's social networking system privacy settings and the endorsing user's relationship with the viewing user.

System Architecture

Figure 2A:
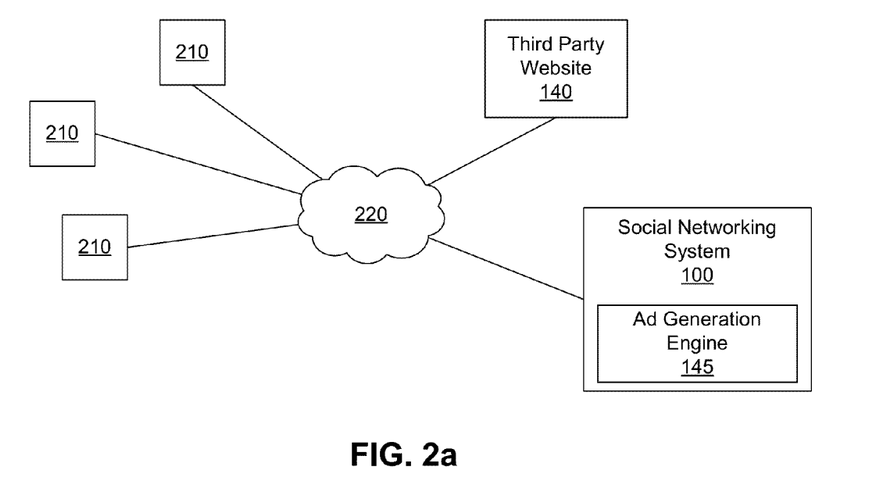
FIG. 2a is a network diagram of a system for providing user endorsed advertisements to users of a social networking system, in accordance with an embodiment of the invention.

FIG. 2A is a high level block diagram illustrating a system environment suitable for operation of a social networking system 100. The system environment comprises one or more client devices 210, one or more third-party websites 140, a social networking system 100, and a network 220. In alternative configurations, different and/or additional modules can be included in the system.

The client devices 210 comprise one or more computing devices that can receive member input and can transmit and receive data via the network 220. For example, the client devices 210 may be desktop computers, laptop computers, tablet computers (pads), smart phones, personal digital assistants (PDAs), or any other device including computing functionality and data communication capabilities. The client devices 220 are configured to communicate via network 220, which may comprise any combination of local area and/or wide area networks, using both wired and wireless communication systems. As described above, the third party website 140 and the action terminal 150 are coupled to the network 220 for communicating messages to the social networking system 100 about the users' actions off the system 100.

The social networking system 100 comprises a computing system that allows users to communicate or otherwise interact with each other and access content as described herein. In one embodiment, the social networking system 100 stores member profiles that describe the users of a social network, including biographic, demographic, and other types of descriptive information, such as work experience, educational history, hobbies or preferences, location, and the like.

Figure 2B:
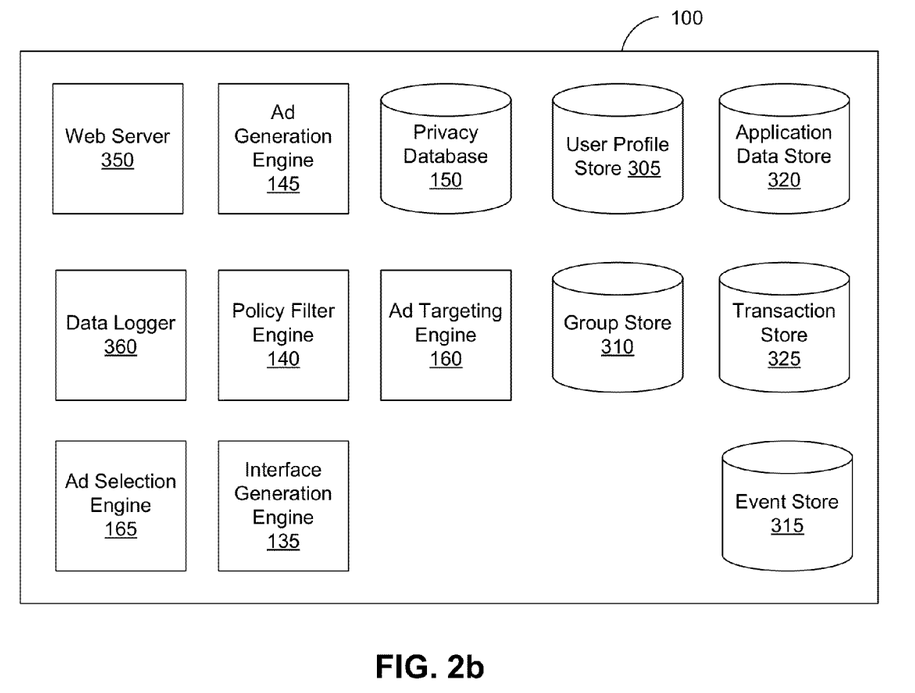
FIG. 2b is a block diagram of a social networking system, in accordance with an embodiment of the invention.

FIG. 2b is an example block diagram of a social networking system 100. The social networking system 100 includes a web server 350, an ad generation engine 145, an ad targeting engine 160, a policy filter engine 140, an ad selection engine 165, a privacy database 150, a user profile store 305, a group store 310, an event store 315, an application data store 320, a transaction store 325, and a content store 330. In other embodiments, the social networking system 100 may include additional, fewer, or different modules for various applications.

The web server 350 links the social networking system 100 via the network 220 to one or more client devices 210, as well as to one or more third party websites 140. The web server 350 may include a mail server or other messaging functionality for receiving and routing messages between the social networking system 100 and the client devices 210 or third party websites 140. The messages can be instant messages, queued messages (e.g., email), text and SMS messages, or any other suitable messaging technique.

The data logger 360 is capable of receiving communications from the web server 350 about member actions on and/or off the social networking system 100. The data logger 360 populates the data log 160 with information about these member actions and communications tracked in the object data stores. As discussed above, the social networking system 100 maintains data about a number of different types of objects with which a member may interact on the system 100. To this end, each of the member profile store 305, the group store 310, the event store 315, the application data store 320, and the transaction store 325 store data structures to manage the data for each instance of the corresponding type of object maintained by the system 100. The data structures comprise information fields that are suitable for the corresponding type of object. (For example, the event store 315 contains data structures that include the time and location for an event, whereas the member profile store 305 contains data structures with fields suitable for describing a member's profile.) When a new object of a particular type is created, the system 100 initializes a new data structure of the corresponding type, assigns a unique object identifier to it, and begins to add data to the object as needed. This might occur, for example, when a member defines a new event, wherein the system 100 would generate a new instance of an event in the event store 315, assign a unique identifier to the event, and begin to populate the fields of the event with information provided by the member.

In one embodiment, the social networking system stores one or more advertisement templates 120, which it may receive from one or more advertisers. The advertisement template may include advertisement content and fields to for a user endorsement. In one embodiment, the advertisement content provided by the advertiser can include a product name, date, time, location, and link associated with an advertised event, etc. In other embodiments, the social networking system also receives a movie clip or one or more images as part of the advertisement template.

In one embodiment, the social networking system generates an advertisement template 120 for an object, node or item within the social networking system. For example, the social networking system can generate an advertisement template 120 for an object within, such as "running," to allow a user to endorse running to others in the social networking system.

In one embodiment, the user interface generation engine 135 generates an endorsement user interface responsive to the received advertisement template 120. This endorsement user interface may include heading information and input fields where a user can enter endorsement information. The input fields enable a user to enter endorsements. For example, the user interface can include a title field, to allow a user to input a title for the advertisement. The user interface may also include an endorsement field, where a user can input an endorsement. The endorsement field prompts a user to provide a particular type of content. For example, the user interface may contain the text "I liked AVATAR because," where the user endorsement is meant to follow the provided text in the advertisement. In another embodiment, the user interface contains event information fields if applicable. For example, if the advertisement is for an event, such as a movie or a concert, the user interface can provide fields to allow a user to fill in the event location and time information of when the user attended the event.

The user interface may provide several predefined answers provided by an advertiser 110, one of which can be selected by the user. In another embodiment, the endorsement user interface provides targeting options to the endorsing user. For example, the endorsement user interface can provide a text box or user selectable choice, wherein the endorsing user can provide the users of social networking system allowed to view an advertisement based on the user's endorsement. In one instance, the user can provide that only users of the social networking system who are friends with the user or friends of friends of the user can view an advertisement generated based on the endorsing user's endorsement. In other embodiments, other options can be provided to the user.

Figure 4:
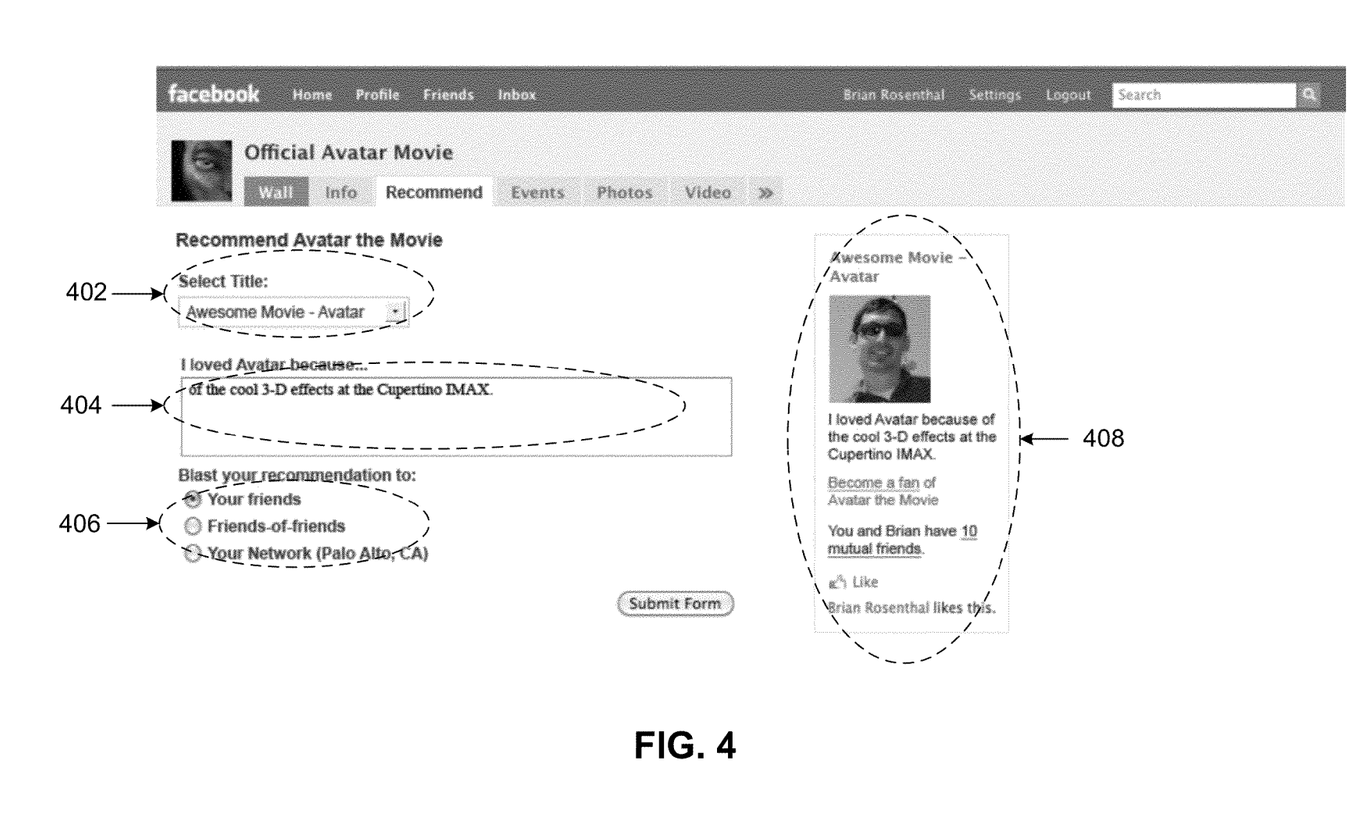
FIG. 4 is an exemplary embodiment of a user interface to receive user endorsement for an advertised product or event.

FIG. 4 illustrates a user interface generated by the social networking system to receive a user endorsement for a particular product. As shown in FIG. 4, the user interface is generated for a web page hosted by a social networking system. The user interface page includes a title selection interface 402, an endorsement interface 404, display interface 406, and preview interface 408 components.

As illustrated in FIG. 4, the title selection interface component 402 comprises a drop-down menu, wherein the user can select predefined title for the ad generated based on the user's endorsement. The endorsement user interface illustrated in FIG. 4 also comprises an endorsement interface component, wherein the user can enter an endorsement for the advertised product. The interface component 404 may be a text box. As discussed in greater detail in reference to FIG. 2b, the user interface can direct a user to provide a particular type of endorsement. For example, the endorsement component can permit a user to finish a sentence such as "I loved Avatar because . . . " The display interface component 406 requests user input regarding which users of the social networking system can view the ad generated based on the user's endorsement. In one embodiment, the user can select between the following three options: the user's friends, friends of friends or all the users in the user's network. As discussed above, the social networking system may broadcast the advertisement only to users who meet the endorsing user's display criteria. In one embodiment, the user interface component can generate an advertisement in real time as the user is inputting his or her endorsement. The preview interface component 408 provides a preview display of an ad generated based on the user's endorsement.

An advertisement endorsement user interface can be provided to the user within the social networking system or outside the social networking system. For example, if a user makes a donation on a political web page, the user can be presented with an endorsement user interface to endorse a donation to the user's connections within the social networking system.

Figure 5A:
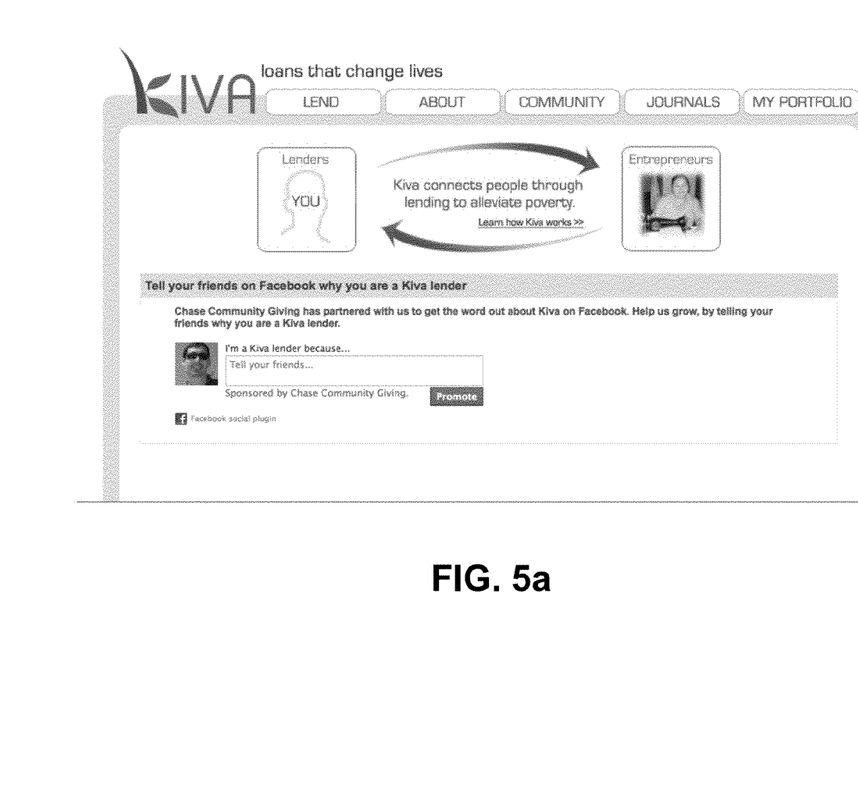
FIG. 5A illustrates one embodiment of a user interface for receiving a user endorsement outside of the social networking system.
Figure 5B:
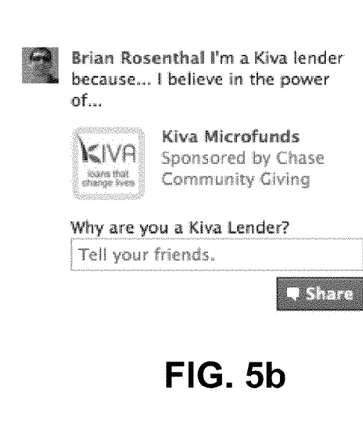
FIG. 5B illustrates one embodiment of a user interface showing a user endorsement displayed as an advertisement.

FIG. 5 illustrates a user interface generated by the social networking system to receive a user endorsement outside of the social networking system. As shown in FIG. 5a, the user interface is generated for a web page hosted by an administrator outside the social networking system. The user interface page includes an endorsement interface text box to receive user endorsement. As discussed in greater detail below, an endorsement received from a webpage outside the social networking system can be displayed within the social networking system as an advertisement. As illustrated in FIG. 5b, the user endorsement can be displayed as an advertisement within the social networking system wherein other users can provide an endorsement to user endorsed advertisement. For example, an endorsed advertisement can include an interface component to receive endorsement from the viewing user. The social networking system uses the method described herein to generate an advertisement based on the viewing user's endorsement. As such, the social networking system can allow advertisers to leverage the users' endorsements.

In one embodiment, a policy filter engine 140 is used to ensure that the user recommendation is consistent with advertiser 110 provided guidelines. For example, if the user recommendation is negative or critical of a product an advertiser 110 may want, the policy filter engine 140 may block the advertisement 170 from being broadcast. In another embodiment, the policy filter engine 140 flags a critical advertisement 170 for removal from the social networking system. In one embodiment, the policy filter engine 140 uses a simple word search to identify recommendations likely to be critical of the advertised product. In other embodiments, other methods to identify critical recommendations may be used.

In one embodiment, the ad generation engine 145 generates an advertisement associated with the social networking system based on the endorsing user's endorsement and the advertiser provided advertisement template. For example, an advertiser may provide a user template stating "I like AVATAR because," and a user can provide an endorsement stating "of the special effects." In such an instance, the ad generation engine 145 generates an advertisement stating "I like AVATAR because of the special effects." In addition, the generated advertisement can include additional information stored in the social networking system, such as the name and a picture of the endorsing user, the number of users who have endorsed the advertised product, the number of users who have become fans of an object associated with the advertised product, etc. The generated advertisements can be displayed to a viewing user as banner ads on a webpage hosted by the social networking system, as an interactive pop-up ad, as a part of the viewing user's newsfeed, or in association with an application associated with the social networking system executing on a computing device.

In one embodiment, an ad targeting engine 160 identifies users to display the user generated advertisement 170. In one embodiment, the ad targeting engine 160 identifies users based on the user's social networking privacy policy embodied in a privacy setting database 150. For example, a user may provide in a privacy policy stored in privacy setting database 150, to display user generated content only to the user's friends. In such case, the ad targeting engine 160 will only display the user generated ad to friends of the user within the social networking system. In another embodiment, the ad targeting module identifies users to display the user generated advertisement 170 based on targeting criteria provided by an advertiser 110. For example, an advertiser 110 can provide that a particular product should be advertised to male users only or to users who identify themselves as NFL fans with the social networking system. In such an embodiment, the ad targeting engine 160 provides the user generated advertisements 170 to the male users who identify themselves as NFL fans. In one embodiment, the ad targeting engine 160 identifies users to display based on both user provided privacy settings and advertiser 110 provided targeting criteria. In such an embodiment, the ad targeting module displays ads to users who are friends with the user, male and identify themselves as NFL fans. In one embodiment, the ad targeting engine 160 generates a candidate list of user based on the user's privacy settings and advertiser 110 provided targeting criteria.

In another embodiment, the ad selection engine 165 identifies the advertisements based on user endorsements to display to a viewing user. For example, in response to a viewing user requesting a webpage or an object associated with the social networking system, the ad selection engine 165 selects an ad generated by the ad generation engine 145 to serve to the viewing user. In one embodiment, the ad selection engine 165 ranks advertisements generated by the ad generation engine 145 according to their expected value. The expected value accounts for the probability of the viewing user clicking on the advertisement and the price for each advertisement as applied to click through pricing models. The ad selection engine 165 may also select an advertisement to display to the user based on whether the user meets the advertiser provided ad targeting criteria. In another embodiment, the ad selection engine 165 takes into account the endorsing user provided targeting criteria. For example, if the endorsing user provides that the advertisement generated based on the user's endorsement should only be displayed to friends of the users, the ad selection engine 165 only selects the generated advertisement for display if the viewing user is a friend of the endorsing user.

In one embodiment, an advertisement 170 includes the user provided content along with advertiser 110 provided template information. For example, advertiser 110 provided information, such as "I love AVATAR because" can be displayed with user provided content such as "it has great special effects." In other embodiments, advertiser 110 provided information can include a title associated with the advertisement 170, a picture, a link to an advertiser 110 provided web page, location information, show time information if applicable etc. In another embodiment, the advertisement 170 can include a link to add an event associated with the advertisement 170 to a user calendar. In other embodiments, the advertisement 170 can include the relationship between the user and the user to whom the advertisement 170 is displayed. In other embodiments, the user provided content included in the advertisement 170 can be recommendations, when and where user attended the event, if applicable etc.

In one embodiment, the social networking system displays the advertisements 170 to viewing users within the social networking system. In one embodiment, the ads are displayed to users identified by the ad targeting engine 160. In another embodiment, the social networking system displays the advertisement 170 to the top ranked users identified by the ranking engine.

Providing User Generated Advertisements

Figure 3A:
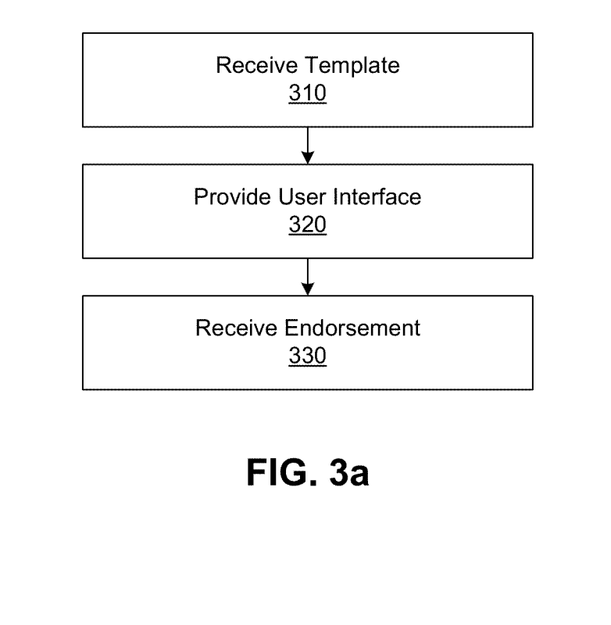
FIG. 3a illustrates one embodiment of a process in which the social networking system receives user endorsement for one or more products sponsored by an advertiser.

FIG. 3a illustrates one embodiment of a process in which the social networking system receives user endorsement for one or more products sponsored by an advertiser. In one embodiment, the social networking system receives 310 a template from an advertiser. As described in reference to FIG. 1, an advertisement template comprises advertising content and one or more fields for a user endorsement. Advertisement content can include text, image or time and location associated with an advertised event. The one or more fields for user endorsement comprise areas that provide context to the user for providing an endorsement.

In one embodiment, the social networking system provides 320 a user interface for the user to enter his or her endorsement. The process may format the provided advertisement template to generate a user interface. In another embodiment, the process generates different user interfaces compatible with, for example, a web browser executing on a computing device, an application executing on a mobile device, etc.

In one embodiment, the social networking system receives 330 a user endorsement responsive to the user entering and submitting an endorsement. For example, a user can provide one or more reasons the user likes or enjoys the product sponsored by the advertiser. In one embodiment, the user can enter the endorsement in one or more text boxes in the endorsement user interface. The social networking system receives the endorsement to generate an advertisement as described in greater detail below in reference to FIG. 3b.

Figure 3B:
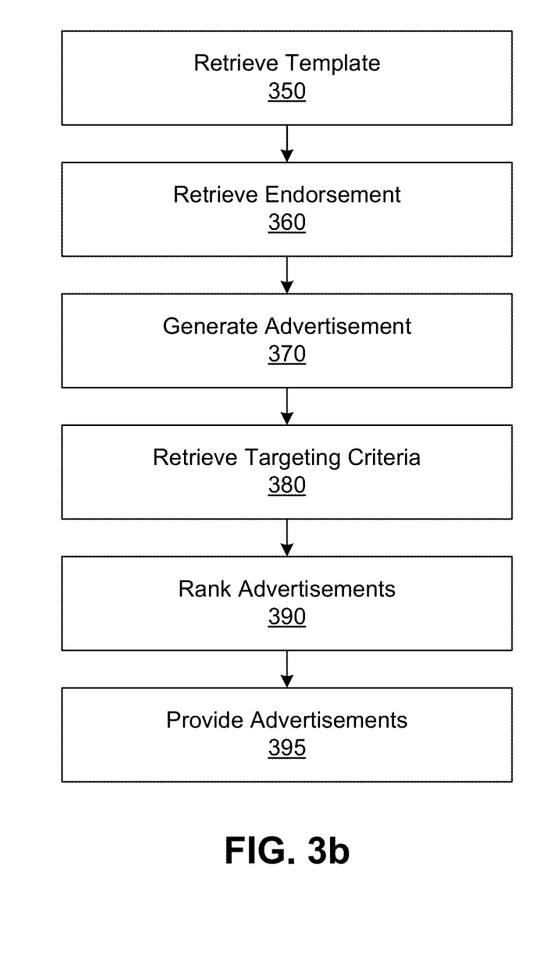
FIG. 3b illustrates one embodiment of a process in which the social networking system generates a user-endorsed advertisement and provides the advertisement to a viewing user.

FIG. 3b illustrates one embodiment of a process in which the social networking system combines an advertisement message with a user endorsement to generate and provide advertisements. In one embodiment, the process retrieves 350 advertiser-provided content associated with the ad template. Additionally, the process retrieves 360 the user provided advertisement content to generate 370 an advertisement. In one embodiment, the advertisement is generated responsive to the ad space purchased by the advertiser. For example, the process generates an advertisement responsive to whether the advertiser purchased a text-only advertisement or an ad that contains images, videos, etc.

In one embodiment, the process retrieves 380 targeting criteria provided by the advertiser. For example, an advertiser can provide that an ad based on a particular ad template should be targeted to women living in or checking-in from California. In another embodiment, the process retrieves 380 targeting criteria provided by the endorsing user. For example, the endorsing user can provide that an ad based on the user's endorsement should only be displayed to friends of the user in the social networking system. In one embodiment, the user provides the targeting criteria through the endorsement user interface. In another embodiment, the user targeting criteria can be retrieved 380 through the user's account settings and privacy settings.

In one embodiment, the process ranks 390 user endorsed advertisements generated 370 by the social networking system. The user endorsed advertisements may be ranked 390 based on a combination of the likelihood a viewing user will click on the advertisement and the fees generated responsive to displaying the advertisement. In another embodiment, the social networking system ranks 390 advertisements based on whether the viewing user meets the targeting criteria associated with the advertisement. Similarly, the process 390 ranks advertisements based on whether the viewing user meets the endorsing user's broadcast criteria. In one embodiment, the process 390 ranks advertisements responsive to the viewing user requesting a webpage or an object associated with the social networking system wherein a user endorsed advertisement can be displayed.

In one embodiment, the social networking system provides 395 user endorsed advertisements to the viewing user. For example, if the viewing user visits a web page hosted by the social networking system, the process displays 395 the highest ranked 390 user endorsed advertisement to the viewing user. As discussed in greater detail in reference to FIG. 1, the user endorsed advertisements can be displayed as banner ads, pop-up windows, an image on an application, as a newsfeed story, or in any other communication mechanism either within or outside of the social networking system.

Summary

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:
receiving an advertisement template from an advertiser, the advertisement template comprising advertising content and one or more fields for a user endorsement;
receiving targeting criteria associated with the advertisement template;
providing a user interface for receiving a user endorsement in connection with the advertisement template;
receiving a user endorsement for the advertisement template from an endorsing user of a social networking system;
generating, by a computer system, an advertisement by combining the user endorsement and the advertisement template;
receiving from the endorsing user a definition of a set of candidate viewing users in the social networking system who can view the advertisement;
selecting, by the computer system, a viewing user from the set of candidate viewing users to view the generated advertisement, the selecting based on the targeting criteria, a relationship between the viewing user and the endorsing user in the social networking system, and the definition of the set of candidate viewing users; and
sending the generated advertisement for display to the selected viewing user.

2. The method of claim 1, wherein the fields of the advertisement template comprise at least one of a title field and a message field.

3. The method of claim 1, wherein the user endorsement comprises at least one of text endorsing the advertised product.

4. The method of claim 1, wherein the user interface for receiving a user endorsement comprises one or more from the group consisting of liking an object, becoming a fan of an object, updating profile information associated with an advertised product, and commenting on an item associated with the advertised product within the social networking system.

5. The method of claim 1, further comprising:
verifying the user endorsement, the verification performed to determine if the endorsement is consistent with one or more advertising criteria.

6. The method of claim 5, wherein the verifying comprises:
receiving from the advertiser verification criteria for accepting a user endorsement; and
applying the verification criteria to the user endorsement.

7. The method of claim 5, wherein the verification criteria rejects a user endorsement if it contains negative content about a subject of the advertisement.

8. The method of claim 1, wherein an advertisement is displayed to the viewing user as a banner ad, an interactive ad, a wall post, a newsfeed story, or an email message within the social networking system.

9. The method of claim 1, wherein the advertiser is not the endorsing user.

10. The method of claim 1, wherein the definition of the set of candidate viewing users comprises connections of the endorsing user in the social networking system.

11. The method of claim 1, wherein the definition of the set of candidate viewing users comprises users in the same network as the endorsing user in the social networking system.

12. A method comprising:
receiving an advertisement template from an advertiser, the advertisement template comprising advertising content and one or more fields for a user endorsement;
receiving targeting criteria associated with the advertisement template;
receiving a user endorsement for the advertisement template from each of a plurality of endorsing users of a social networking system;
matching the targeting criteria to a viewing user of the social networking system;
receiving from each of the plurality of endorsing users a definition of a set of candidate viewing users in the social networking system who can view the advertisement;
selecting by a computer system a user endorsement for the viewing user based at least in part on relationship between the viewing user and one or more of the endorsing users in the social networking system and at least in part based on the viewing user being subject to the definition of the set of candidate viewing users;
generating by the computer system an advertisement by combining the selected user endorsement and the advertisement template; and
sending the generated advertisement for display to the viewing user.

13. The method of claim 12, wherein the fields of the advertisement template comprise at least one of a title field and a message field.

14. The method of claim 12, wherein the user endorsement comprises at least one of text endorsing the advertised product.

15. The method of claim 12, further comprising:
verifying the user endorsement, the verification performed to determine if the endorsement is consistent with one or more advertising criteria.

16. The method of claim 15, wherein the verifying comprises:
receiving from the advertiser verification criteria for accepting a user endorsement; and
applying the verification criteria to the user endorsement.

17. The method of claim 15, wherein the verification criteria rejects a user endorsement if it contains negative content about a subject of the advertisement.

18. The method of claim 12, wherein an advertisement is displayed to the viewing user as a banner ad, an interactive ad, a wall post, a newsfeed story, or an email message within the social networking system.

19. The method of claim 12, wherein the advertiser is not included in the one or more endorsing users.

20. The method of claim 12, wherein the definition of the set of candidate viewing users comprises connections of the endorsing user in the social networking system.

* * * * *